United States Patent [19]

Müller et al.

[11] 3,879,233

[45] Apr. 22, 1975

[54] SMOKELESS FLUXING MATERIAL FOR HOT TIN-COATING, HOT-LEADING, AND HOT-GALVANIZING

[75] Inventors: Wolfgang Müller, Mannheim-Rheinau; Wilhelm Brugger, Hosel, both of Germany

[73] Assignee: The Goldschmidt AG, Essen, Germany

[22] Filed: Apr. 9, 1973

[21] Appl. No.: 349,381

[30] Foreign Priority Application Data

Nov. 11, 1972 Germany ........................ 2255433

[52] U.S. Cl. .................................................. 148/26

[51] Int. Cl. ........................................... B23k 35/34

[58] Field of Search ....................................... 148/26

[56] References Cited

UNITED STATES PATENTS 3,244,551 4/1966 Heins .................................. 148/26

*Primary Examiner*—Winston A. Douglas
*Assistant Examiner*—Mark Bell
*Attorney, Agent, or Firm*—James E. Bryan

[57] ABSTRACT

This invention relates to a smokeless fluxing material for hot-tin-coating, hot-galvanizing, and hot leading, comprising zinc chloride and an effective content of zirconium oxychloride.

1 Claim, No Drawings

SMOKELESS FLUXING MATERIAL FOR HOT TIN-COATING, HOT-LEADING, AND HOT-GALVANIZING

The present invention relates to an improved smokeless fluxing material according to copending application Ser. No. 349,380, filed Apr. 9, 1973, which is employed in the hot-metallizing art or technique.

The copending application is concerned with and discloses a smokeless fluxing material comprising an effective content of cerite chloride and/or zirconium tetrachloride, and the fluxing material is free from ammonium chloride. A further embodiment of the smokeless fluxing material is a mixture of zinc chloride, potassium chloride, sodium chloride, calcium chloride and/or zirconium tetrachloride. A preferred embodiment of the smokeless fluxing material is a mixture of 67 percent by weight of zinc chloride, 25 percent by weight of an eutectic mixture of sodium chloride and potassium chloride, 4 percent by weight of calcium chloride, and 4 percent of zirconium tetrachloride.

In handling these mixtures in actual practice, it now has been found that the aforementioned mixtures split-off or evolve hydrogen chloride when being stored. This renders the use thereof in the hot-metallization art difficult. This splitting-off, or cleavage, of hydrogen chloride takes place from the zirconium tetrachloride present in the mixture as a result of the access of atmospheric moisture thereto.

This disadvantage is now obviated, in accordance with the present invention, in that zirconium oxychloride is used in the place of zirconium tetrachloride. Preferred is the use of water of crystallization-containing zirconium oxychloride, preferably $ZrOCl_2 \cdot 6H_2O$. Particularly preferred is a mixture having the following composition - 68.0 percent by weight of zinc chloride, 24 percent by weight of an eutectic mixture of sodium chloride and potassium chloride, and 8 percent by weight of zirconium oxychloride with 6 moles of bound water.

The present invention will be described in further detail in the following example:

EXAMPLE

A 35 percent by weight aqueous solution is prepared from a salt mixture of 68.0 percent by weight of zinc chloride, 24 percent by weight of an eutectic mixture of sodium chloride and potassium chloride, and 8 percent by weight of zirconium oxychloride with 6 moles of bound water.

Immersed into this fluxing material solution are stained parts to be galvanized. Thereafter, the excess solution is allowed to drip off.

The fluxing material solution that has remained on the surface is dried in a warming cabinet at 180°C onto the surface of the parts to be galvanized, and the still hot parts or elements are immersed into a clear or blank zinc bath at 450° –470°C.

There is practically no development of smoke during the galvanization.

It will be obvious to those skilled in the art that many modifications may be made within the scope of the present invention without departing from the spirit thereof, and the invention includes all such modifications.

What is claimed is:

1. A smokeless fluxing material for hot tin-coating, hot-galvanizing, and hot-leading, comprising a mixture of 68 percent by weight of zinc chloride, 24 percent by weight of an eutectic mixture of sodium chloride and potassium chloride, and 8 percent by weight of $ZrOCl_2 \cdot 6H_2O$.

* * * * *

UNITED STATES PATENT OFFICE
CERTIFICATE OF CORRECTION

PATENT NO. : 3,879,233

DATED : April 22, 1975

INVENTOR(S) : Wolfgang Müller, and Wilhelm Brugger

It is certified that error appears in the above-identified patent and that said Letters Patent are hereby corrected as shown below:

Item [73] , "The" should read - - - Th. - - -.

Signed and sealed this 1st day of July 1975.

(SEAL)
Attest:

RUTH C. MASON
Attesting Officer

C. MARSHALL DANN
Commissioner of Patents and Trademarks